United States Patent
Okumura et al.

(10) Patent No.: US 7,584,631 B2
(45) Date of Patent: Sep. 8, 2009

(54) MEMBER FOR SUPPORTING MAGNETIC DISC SUBSTRATES, PROCESS OF PRODUCING THE SAME, AND MAGNETIC DISC DEVICE USING THE SAME

(75) Inventors: Masahiro Okumura, Shiga (JP); Tetsuzi Hayasaki, Kokubu (JP)

(73) Assignee: Kyocera Corporation, Kyoto (JP)

(*) Notice: Subject to any disclaimer, the term of this patent is extended or adjusted under 35 U.S.C. 154(b) by 44 days.

(21) Appl. No.: 11/613,672

(22) Filed: Dec. 20, 2006

(65) Prior Publication Data
US 2007/0111041 A1 May 17, 2007

Related U.S. Application Data

(62) Division of application No. 10/401,513, filed on Mar. 28, 2003, now Pat. No. 7,179,550.

(30) Foreign Application Priority Data
Mar. 28, 2002 (JP) .............................. 2002-092549

(51) Int. Cl.
G11B 5/64 (2006.01)
B32B 19/00 (2006.01)
C03C 10/00 (2006.01)
C03C 15/00 (2006.01)

(52) U.S. Cl. ............... 65/60.7; 428/800; 360/99.12; 501/97.4; 65/104

(58) Field of Classification Search ............ 419/5, 419/6, 7, 8, 9; 148/DIG. 3, DIG. 123; 360/97.1, 360/131, 98.02, 99.12; 428/900, 901, 410, 428/432, 433, 800, 692.1, 846, 846.2, 847.1, 428/848, 848.7, 64.4, 846.6; 720/721, 722; 501/94, 97.4, 110, 112, 101, 135, 69; 313/291, 313/250, 257, 258, 289; 29/25.35; 381/190; 65/60.7, 104; 156/89.16
See application file for complete search history.

(56) References Cited

U.S. PATENT DOCUMENTS 3,749,855 A 7/1973 Schafft .................... 381/190

(Continued)

FOREIGN PATENT DOCUMENTS

| JP | 07-098912 | 4/1995 |
|---|---|---|
| JP | 09-027177 | 1/1997 |
| JP | 09-044969 | 2/1997 |
| KR | 2000-0066471 | * 11/2000 |

*Primary Examiner*—Kevin M. Bernatz
*Assistant Examiner*—Louis Falasco
(74) *Attorney, Agent, or Firm*—Hogan & Hartson LLP

(57) ABSTRACT

A member of supporting magnetic disc substrates is provided, comprising a ceramic sinter containing a ceramic component and at least one conductive component selected from a group consisting of iron, niobium, tin zinc, copper, nickel, cobalt, and chromium, wherein the ceramic sinter has conductive aggregates on its peripheral surface. In the member, the ceramic component may be forsterite and the conductive component is iron oxide, wherein the ceramic sinter comprises a main phase of $2MgO.SiO_2$ and a secondary phase of at least one of $MgFe_2O_4$, $Fe_3O_4$, and $Fe_2O_3$. The ceramic sinter can be produced by a process including: sintering a ceramic sinter from a ceramic component and at least one conductive component selected from a group consisting of iron, niobium, tin zinc, copper, nickel, cobalt and chromium; machining the sinter into a desired shape of a member of supporting a magnetic disc substrate, and annealing the sinter such that the ceramic sinter has conductive aggregation deposited on its peripheral surface, wherein in the annealing step, the member is heated at a temperature in between a glass transition temperature of the sinter minus 500° C. and a softening temperature of the sinter plus 600° C.

5 Claims, 5 Drawing Sheets

U.S. PATENT DOCUMENTS

| | | | |
|---|---|---|---|
| 5,167,271 A | 12/1992 | Lange et al. | 164/98 |
| 5,262,595 A | 11/1993 | Yano et al. | 428/901 |
| 5,292,477 A * | 3/1994 | Chance et al. | 156/89.16 |
| 5,579,534 A | 11/1996 | Itoh et al. | 428/553 |
| 5,875,171 A | 2/1999 | Albrecht et al. | 360/98.08 |
| 5,969,902 A | 10/1999 | Okumura et al. | 360/99.08 |
| 6,146,551 A * | 11/2000 | Hayasaki et al. | 252/518.1 |
| 6,182,340 B1 | 2/2001 | Bishop | 29/25.35 |
| 6,220,055 B1 * | 4/2001 | Francel et al. | 65/60.5 |
| 6,258,440 B1 * | 7/2001 | Aihara et al. | 428/141 |
| 6,548,011 B1 * | 4/2003 | Rhee et al. | 501/127 |
| 6,613,383 B1 | 9/2003 | George et al. | 427/218 |
| 6,642,165 B2 | 11/2003 | Miyashita et al. | 501/97.4 |
| 6,803,138 B2 | 10/2004 | Seabaugh et al. | 429/33 |
| 6,805,971 B2 | 10/2004 | Talia et al. | 428/553 |

* cited by examiner

MEMBER FOR SUPPORTING MAGNETIC DISC SUBSTRATES, PROCESS OF PRODUCING THE SAME, AND MAGNETIC DISC DEVICE USING THE SAME

CROSS-REFERENCE TO THE RELATED APPLICATIONS

This is a divisional of application Ser. No. 10/401,513 filed Mar. 28, 2003 now U.S. Pat. No. 7,179,550, the entire contents of which are incorporated by reference. This application also claims benefit of priority under 35 U.S.C. § 119 to Japanese Patent Application No. 2002-092549 filed Mar. 28, 2002, the entire contents of which are incorporated by reference.

BACKGROUND OF THE INVENTION

1. Field of the Invention

The present invention relates a member for supporting magnetic disc substrates stacked around a hub for a magnetic disc memory device and to a process of producing such a supporting member for a magnetic disc memory device.

2. Prior Art

Magnetic disc memory devices, which have widely been used in a wide variety of computerized electronic appliances. A conventional magnetic disc memory device is shown in FIG. 3, which includes a hub 5 which is fixed by an driving axis 4 and rotated at high speed, a plurality of magnetic disc substrates 6 which are stacked spaced from each other around the central hub and a plurality of spacers each which is inserted between the adjacent two of the magnetic disc substrates for spacing between the two. A cramp disc also is used to fit on the top end of the hub by screws and fix the topmost magnetic disc substrate.

In magnetic disc memory devices, one or more magnetic heads are disposed movably in space between the adjacent magnetic disc substrates to truck recording magnetic faces formed on the substrates in a non-contact mode, In use, while the magnetic disc substrates are being rotated at a controlled speed, magnetic heads read and write necessary information and data at allotted portions on the recording magnetic faces of the substrates.

Recently, in order to increase recording capacity for the memory devices, higher information density has been required than before and therefore a clearance of a magnetic head relative to a magnetic recording face must be made as small as possible. For this purpose, magnetic recording faces of magnetic memory discs are necessary to have higher flatness and smoothness with substrates prevented from deflecting.

Proposals have been made to form magnetic disc substrates of aluminum, ceramic or glass, and to make members for supporting the magnetic disc substrates such as spacers, shims and cramps out of ceramic. These materials are almost free of temperature change in dimensions and are highly and precisely machinable.

Further, magnetic memory discs are known to often suffer from electrostatic charging, which has a risk of destroying information recorded on the discs. Japanese Patent publication Nos. 09-027177, 09-044969, and 07-098912 have proposed that substrates for magnetic memory discs are fabricated of ceramic sintered materials with electric conductivity or semiconductivity, for example, based on alumina, zirconia, forsterite or steatite. The conductive sinters can release accumulated charges from the surfaces of the discs to earth and protect stored information on the recording faces from destroying.

However, in the case where supporting members made of ceramics are disposed in magnetic disc memory devices such that a clearance between a magnetic head and a magnetic disc is set below 0.1 µm, there is a risk of particles occluding the clearance or making a magnetic head push a disc recording face, which damages information and data having sorted on the recording face. Ceramic sinters are generally of polycrystalline structure which is formed by firing a compacted ceramic powder so that they have some voids or pores opening in the surfaces.

After polishing such ceramic sinters to be made into a desirable shape, cut shavings or polished grains are left within the open pores, which can not perfectly be removed even if the sinters are cleaned and rinsed, for example, using conventional ultrasonic cleaning or ultraviolet ionized cleaning methods. In use of disc devices, such particles are separated apart from the voids due to centrifugal force or vibration and transferred onto the recording faces of the magnetic memory discs, deteriorating the recording faces.

SUMMARY OF THE INVENTION

An object of the present invention is to provide a supporting member for magnetic disc substrates which is capable of inhibiting particles form emanating therefrom in use of magnetic disc memory devices and to provide a process of producing such a supporting member.

Another object of the present invention is to provide a supporting member for supporting magnetic disc substrates which is capable of discharging charges thereon in use of magnetic disc memory devices and to provide a process of producing such a supporting member.

Still another object of the present invention is to provide magnetic disc memory device which contains a supporting member having such functions.

In order to fulfill the above objects, a supporting member for supporting a magnetic disc substrate includes a ceramic sinter containing a ceramic component as a major component and an electrically conductive component which can be capable of being aggregated on a surface of the ceramic sinter to reduce specific resistance.

The supporting member of the present invention has an advantage of securing antistatic performances for the supporting member in order to avoid the electrostatic breakdown of information recorded on magnetic memory discs.

The supporting member of the present invention may be a spacer which provides a space between adjacent memory substrates. The supporting member of the present invention may be a clamp member to clamp the uppermost substrate of stacked magnetic memory substrates to a hub to build up a magnetic memory disc device.

In the supporting member, the ceramic sinter may be constituted with a ceramic component of forsterite $2MgO \cdot SiO_2$, and a conductive component of iron oxide which is contained in the form of $MgFe_2O_4$, $Fe_3O_4$ and $Fe_2O_3$. The ceramic sinter may have a core portion deficit in $Fe_2O_3$ and a surface layer relatively rich in $Fe_2O_3$, this structure of which is effective to reduce a surface resistance of a hold member.

The process of producing a supporting member according to the present invention includes sintering a powder mixture of a ceramic component and a conductive component into a sinter having a desired shape; grinding the sinter with a dimension preciseness and cleaning the sinter; and heat treating the sinter at a high temperature to form aggregates on a surface of the sinter, reducing a surface resistance and removing residual ground particles on the surface.

In the grinding step a newly surface is produced which includes many pores open therein and ground particles resided in the pores and cracks which are not removed in the cleaning step. The heat treatment step can produce aggregates of a conductive component on the surface of the heat treated sinter to reduce particle number and surface resistance on the sinter surface, preventing the particles from damaging the magnetic memory mechanism.

The heat treatment in the present invention can be carried out at temperature in a range between a glass transition temperature of the sinter minus 500° C. and a softening temperature of the sinter plus 600° C.

BRIEF DESCRIPTION OF THE DRAWINGS

The present invention will be described in further detail below with reference to the accompanying drawings, in which.

DETAILED DESCRIPTION OF THE PREFERRED EMBODIMENTS

Figure 1:
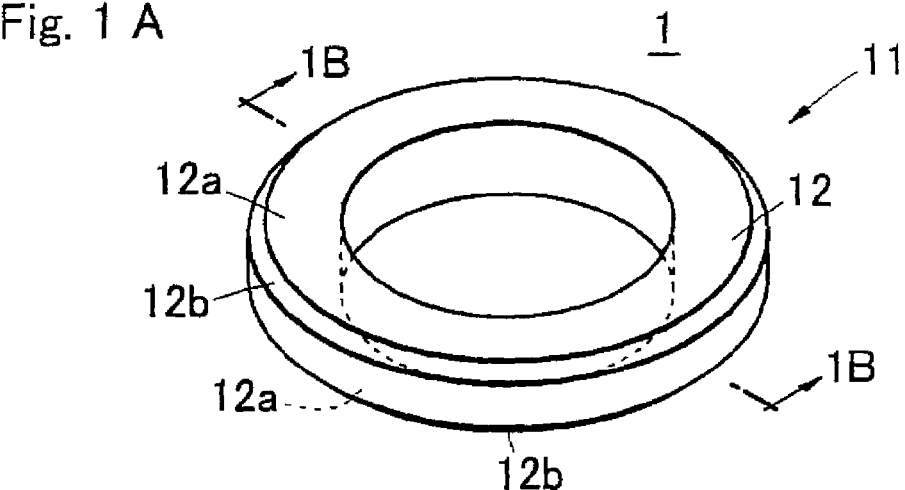
FIG. 1A shows a perspective view of a spacer as an example of supporting member of an embodiment in accordance with the present invention.
FIG. 1B shows a cross-sectional view of a spacer taken along line 1B-1B shown in FIG. 1A.
Figure 1:
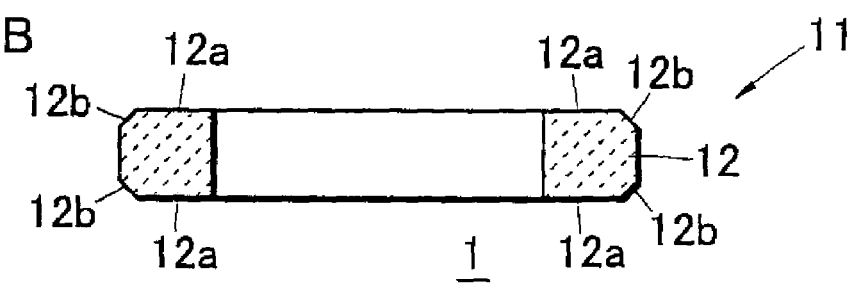

A supporting member for supporting magnetic disc substrates according to the present invention includes a spacer which is disposed between adjacent two of a plurality of magnetic disc substrates stacked around a hub which is fixed on a rotation axis, supporting members and magnetic disc substrates being stacked alternatively one over one, comprising a magnetic disc memory device. The supporting member is a ring having a center hole through which the hub is to be inserted and a outer periphery of a diameter smaller than that of a magnetic disc substrate.

A supporting members for supporting magnetic disc substrates may be a clamp for clamping the topmost of magnetic disc substrates stacked on the top of the hub to be pressed toward the flange of the hub. The clamp may be a disc having a contact face on its major surface coming in contact with the topmost magnetic disc substrate and having one or more screw holes formed therethrough for screwing the clamp on the top of the hub.

A supporting members of the invention may be a shim having an adequate thickness with a similar shape to the space member which is inserted between a clamp and an top of the magnetic disc substrates to adjust a clearance therebetween.

Magnetic discs include substrates taking a form of disc with a small thickness, made of metal such as aluminum, glass, or ceramic such as sapphire, which are fixed by the these supporting members and hub, and a recording magnet film for magnetic recording information which are formed on each of the substrates.

In the present invention, a supporting member is formed of a ceramic sinter which includes a ceramic component and an electrically conductive component, wherein the conductive component contains one or more element selected from a group consisting of iron, tin, zinc, copper, titanium, niobium, nickel, cobalt and chromium to impart a conductive or antielectric property to the sinter.

A ceramic component for constructing a ceramic sinter for supporting members can be selected from materials having a as low difference in thermal expansion coefficient as possible from the magnetic disc substrate made of the above mentioned material. The example of the ceramic components includes oxides such as alumina, zirconia, forsterite, steatite and mullite, nitrides such as aluminum nitride and silicon nitride, and carbides such as silicon carbide. For example, if the magnetic disc substrate is glass, the ceramic component may preferably be made of forsterite or steatite which has a low difference in thermal expansion coefficient from glass.

A conductive component is present as metal or metal oxide in a ceramic sinter and may preferably be agglomerated or condensed in a surface of the supporting member to reduce a surface electric resistance. Having conductivity or antielectricity, the surfaces of the supporting members can discharge electric charges generated on the magnetic discs to the hub and then to the ground by flowing through the supporting members, achieving effective prevention of magnetic discs from electrizing. Preferably, a specific bulk resistance in the surface layer of the supporting members may be $10^{-7}$ Ωcm or less. The surface resistance under the upper limit can provide an antielectric effect high sufficiently for the magnetic discs to maintain its high reliability, without deteriorating in information recorded thereon.

The conductive components, to be added in the ceramic, such as iron, tin, zinc, copper, titanium, niobium, nickel, cobalt and chromium are relatively easily dispersed in ceramic structures, then, decreasing bulk resistance deviation within a ceramic when sintered. Particularly, iron is preferable because it is commercially available at low cost.

A conductive component may preferably be one which forms agglomerated or condensed portions in the surface of the sinter which contribute on surface conductivity in the sinter. Those agglomerated portions are formed by squeezing out molten conductive components from the inner sinter structure to the surfaces in the process of sintering the ceramic at high temperature, which may be glassy or crystalline to contain electric conductive elements therein, having an effect on reduction in a surface resistance.

In the supporting member according to the preferable embodiment of the present invention, the ceramic component may be forsterite containing $2MgO.SiO_2$ and a conductive component may be an iron oxide phase, and a ceramic sinter may have a microstructure containing a forsterite phase and at least one of phases of $MgFe_2O_4$, $Fe_3O_4$ and $Fe_2O_3$ The forsterite phase may include MgO.SiO$_2$, and a solid solution thereof which constitutes a matrix of the ceramic sinter.

Iron oxide may be contained in an amount of to 5 to 55% by weight in terms of Fe$_2$O$_3$ based on the total weight of the sinter. The iron content lower than 5% may not decrease a volume specific resistance of the sinter lower than $1 \times 10^{-7}$ Ωcm while iron at higher content than 55% may lower a bending strength of the sinter.

The ceramic sinters containing a forsterite phase of 2MgO.SiO$_2$ as a major component have characteristics of a thermal expansion coefficient near that of the glass or ceramic making up a plurality of magnetic memory discs, and of high machinability with high dimensional precision. The supporting members formed of such ceramic sinters can support extremely flat-held discs without their deformation due to repeated temperature changes for long time periods, with no strain produced in magnetic discs. Therefore, the magnetic heads can be prevented from being crushed in use, and can be provided in writing and reading magnetic information which is stored in the magnetic surface on the discs.

Such ceramic sinters based on forsterite having conductivity in the presence of iron oxide, as described above, may preferably have iron oxide agglomerates formed on surfaces of the sinters, reducing surface resistance, and preventing magnetic memory discs from electrization.

In order to achieve antistatic performance, the surface layers of ceramic sinters may have a volume specific resistance of $10^4$ to $10^7$ Ωcm. This resistance range can provide reliability high enough to prevent recorded information from breaking down in memory storage devices.

In the preferable embodiment of the present invention, the ceramic sinter may preferably be of a structure in which, in X-ray diffraction analysis using CuKα rays, a peak intensity, at a diffraction angle 2θ of 33°, of a Fe$_2$O$_3$ phase contained inside the core of the sinter is 1 or less with respect to a peak diffraction intensity of 100 in a range of 2θ of 35° to 36° in the present of MgFe$_2$O$_4$, Fe$_3$O$_4$, and Fe$_2$O$_3$ phases, while a peak diffraction intensit, at the diffraction angle 2θ of 33°, of a Fe$_2$O$_3$ phase which is contained in a peripheral surface layer of the sinter is in a range of 1 to 30 with respect to a peak diffraction intensity of 100 in a range of 2θ of 35° to 36° in the present of MgFe$_2$O$_4$, Fe$_3$O$_4$, and Fe$_2$O$_3$ phases.

In the x-ray diffraction analysis, the goniometric technique is used to determine an X-ray intensity diffracted at a specific angle from a sample illuminated with CuKα rays. The peripheral surface layer of the ceramic sinter is relatively rich in Fe$_2$O$_3$ compared to the core of the sinter, which contribute on surface conductive, or antistatic, characteristics. Such an Fe$_2$O$_3$ integrity distribution can be obtained by heating at a desired temperature a sintered ceramic which has machined to a desirable shape as a supporting member.

The ceramic sinter of the supporting member according to the present invention is heated to provide an diffraction intensity in a range of 1 to 30 less with respect to a peak diffraction intensity of 100 in a range of 2θ of 35° to 36° in the present of MgFe$_2$O$_4$, Fe$_2$O$_4$ and Fe$_2$O$_3$ phases under the above X-ray diffraction conditions so that the impurities included or hidden in pores open to, and ground cracks left at, the surface are removed without any deterioration in dimensional preciseness and the porosity and damage can be efficiently remedied, preventing particles from spalling from the surface. Therefore, such a heat treatment is effective to secure the restriction of falling particles during using a supporting member in a magnetic memory device, avoiding damage of the magnetic memory device which otherwise may occur due to separated particles jamming between a recording disc face and a magnetic head.

FIG. 1 shows a spacer 11 as an example of a supporting member 1 to be used for magnetic disc substrates according to the present embodiment, which is a ring plate 12 having a central opening, made of a conductive ceramic sinter containing a conductive component described above. The ring plate 12 has both major surfaces as contact surfaces 12a to be brought in contact with each of adjacent magnetic memory substrates, and is shaped with flat chamfers 12b at an inside and an outside edges of the ring plate.

The ring plate may have an outer diameter of, for example, 15 to 35 mm and an inner diameter of, for example, 12 to 26 mm, with thickness of, for example, 1.0 to 6.0 mm. The contacting surfaces 12a to be brought in contact with magnetic memory substrates may preferably have a flatness of 3 μm or less according to JIS B0621[1984] and have a surface roughness of 2.0 μm or less in arithmetic mean surface roughness Ra according to JIS B0601[1994].

Figure 2:
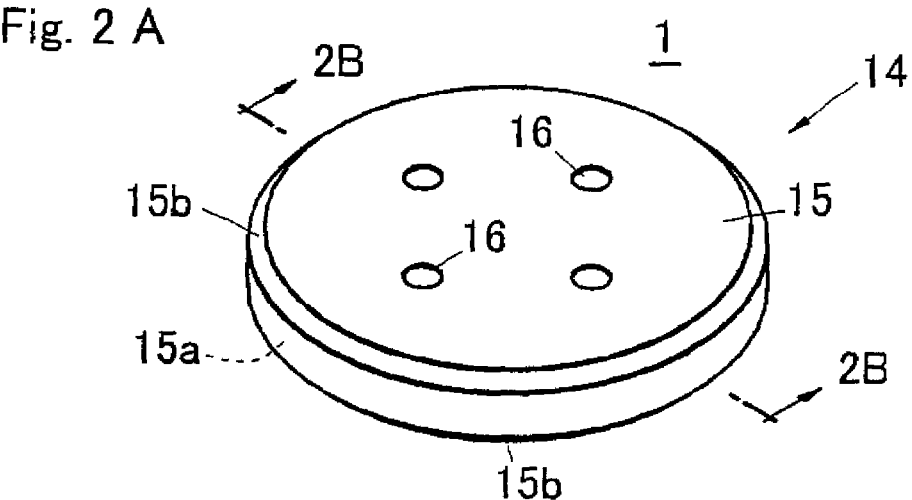
FIG. 2A shows a perspective view of a clamp as another example of a supporting member of another embodiment in accordance with the present invention.
FIG. 2B shows a cross-sectional view of a clamp taken along line 2B-2B shown in FIG. 2A.
Figure 2:
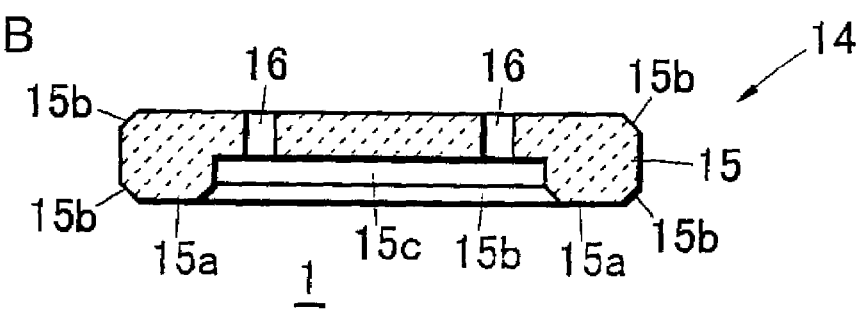

FIGS. 2A and 2B show a clamp member 14 as another example of supporting members 1 according to the embodiment, which is a discal plate 15 made of a ceramic sinter containing an electric conductive component and which has a recess 15 on its bottom side in which a top end of the hub is to be fit, an inner and an outer edges formed with flat chamfers 15b, and a bottom surface as a contacting surface 15a to be brought in constant with an uppermost one of magnetic memory substrates stacked or a shim to be placed on the uppermost substrate. In addition, The discal plate 15 may have screw holes formed therethrough to fasten to the top of a hub with bolts.

For example, the clamp member 14 may has a diameter of 15 to 35 mm, a thickness of 1.0 to 6.0 mm, with a diameter of the recess portion of 0.5 to 10 mm, and the contacting surfaces 15a has a flatness of 3 μm or less according to JIS B0621[1984] and has a roughness of 2.0 μm or less in arithmetic mean surface roughness Ra according to JIS B0601[1994].

Figure 3:
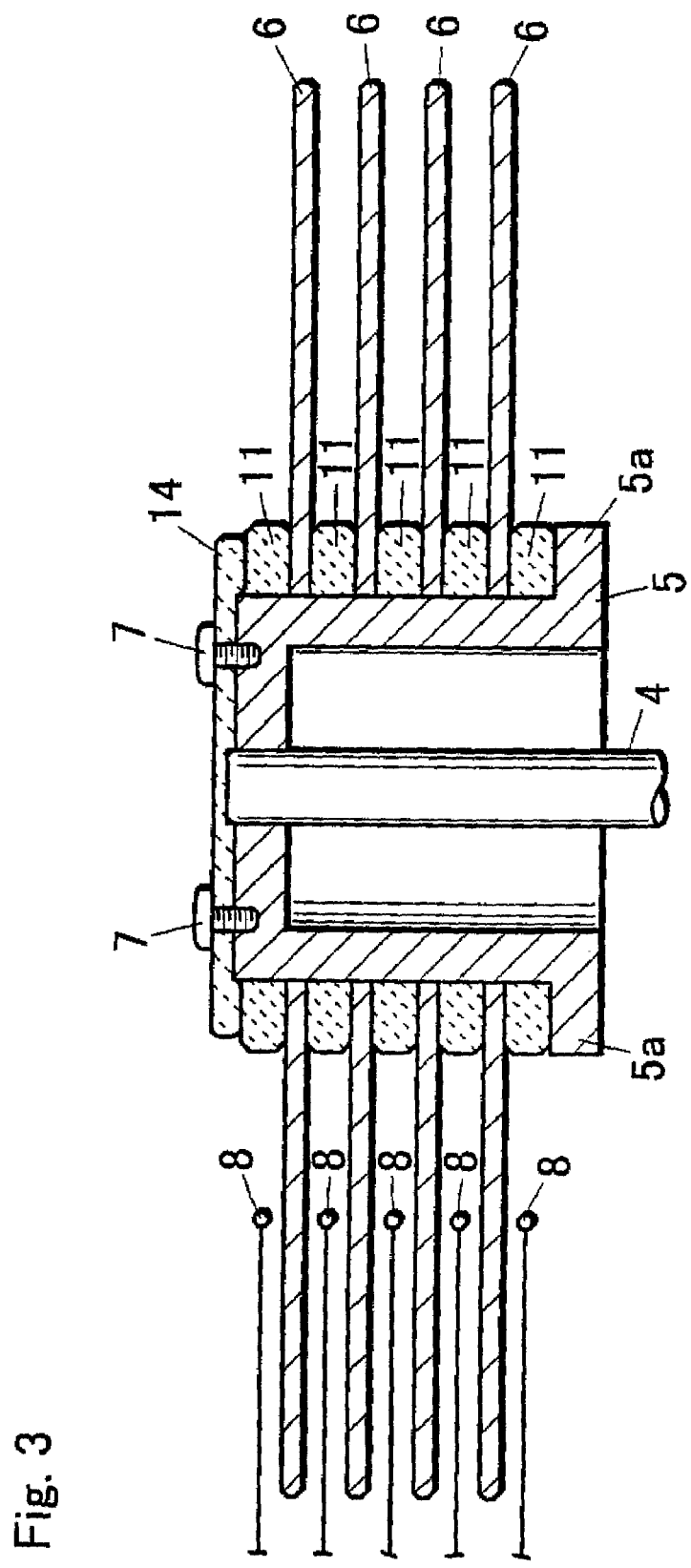
FIG. 3 shows a cross-sectional view of a magnetic disc memory device of another embodiment in accordance with the present invention.

In order to fabricate a magnetic memory device the spacers and the clamp described above may be used to fix a plurality of magnetic memory substrates in the device such that, as shown in FIG. 3, a hub 5 fixed to a rotating shaft 4 is inserted through the central openings of a desired number of the magnetic memory substrates 6 and a number of the spacers 11 which are alternatively stacked and supported on a flange 5a of the hub 5 on the top of which the clamp member is fastened with screws 7 to press the top of the substrates, then supporting the magnetic memory substrates precisely with each defined clearance between adjacent magnetic memory substrates.

In such a magnetic memory device fabricated, the magnetic memory substrates can be rotated through the rotating shaft 4 by a drive motor (not shown), and each of magnetic heads is controlled to move in the respective clearance between the substrates to write or read data on each record surface on the substrates.

According to the present invention, since supporting members including spacers and a clamp, if desired, including a shim, are made of a ceramic sinter capable of being formed with high preciseness without any deformation due to a temperature change in use or any deterioration after long time use, the supporting members can support magnetic memory substrates, define clearances between the substrates which can stably be maintained with no relation to a temperature change in use and without crushing a memory head, and therefore, can provide a magnetic memory device with high reliability.

The process of the invention includes preparing a ceramic sinter which contains a ceramic component and a electric conductive component. The ceramic component can be selected from alumina, zirconia, forsterite, steatite, mullite, silicon carbide and silicon nitride. The ceramic component may preferably be based on forsterite.

The conductive component may be one ore more selected from a group consisting of iron, niobium, tin zinc, copper, nickel, cobalt, and chromium. The conductive element may be one or more oxides of those metal elements.

In a desirable embodiment, the ceramic element is forsterite and the conductive component is iron oxide, since iron oxide may be dispersed uniformly in a forstrite phase of a sinter, which reduces a deviation in bulk specific resistance in the sinter, and also iron oxide is inexpensive and commercially available. In this embodiment, a powder mixture of forsterite and iron oxide, adding a small amount of binder thereto, is kneaded and dried to be granulated. A suitable sintering aid may be added to the forsterite-iron oxide mixture.

The granulated powder is placed into a die and punched into a compact, which may be machined if desired.

The compact is heated and maintained at a sintering temperature in a furnace to obtain a ceramic sinter. The forserite-iron oxide mixture can be sintered at 1200 to 1600□ in air atmosphere.

The ceramic sinter is machined by cutting or grinding to finish its surfaces in precise dimensions, and cleaned to remove the ground particles from the finished surfaces by means of suitable cleaning methods, such as water cleaning with surfactant, ozone or ultraviolet cleaning and ultrasonic cleaning. The cleaning step is performed to wash as many ground particles as possible out of opening pores and machined clacks in the surfaces.

After cleaning, the ceramic sinter is subjected to heat treatment in which the heating temperature is defined with reference to a glass transition temperature individual to the sinter matrix and a softening temperature of the sinter matrix. The heating temperature may particularly, be lower by 500° C. than the glass transition temperature as an lower limit of the heating temperature and higher by 600° C. than the softening temperature as a upper limit of the heating temperature. This temperature range is preferred to form a low electric resistance surface on a sinter and also to prevent the sinter disc from deforming during the heat treatment.

A heating temperature lower than the temperature lower by 500° C. than the glass transition temperature is not sufficient to produce iron oxide aggregates on the surfaces of the ceramic sinter, which has no or little effect on reducing surface resistance. Such a low heating temperature possibly has a risk of ground particles leaving in pores opening in the surfaces. If a heating temperature is higher than the upper limit temperature higher by 600° C. than the softening temperature, the surface of the sinter may be changed to deteriorate its dimension preciseness over the dimension tolerance required for supporting members, resulting in a reject.

A glass transition temperature and a softening temperature can be determined by differential thermal analysis. For example, a forsterite sample has been tested and determined a glass transition temperature to be 689° C. and a softening temperature to be 702° C.

A ceramic sinter of forsetrite containing iron oxide may preferably be heat treated in a heating temperature ranging 400 to 900° C. Heat treatment at a heating temperature lower than 400° C. exhibits no or little effect of the crystal phase of $Fe_2O_3$ on remedy of surface microcracks and is not sufficient to perfectly remove the particles from surface pores or cracks.

This can be understood from the fact that the heat treatment at such a low temperature provides for a sintered ceramic, under the above noted X-ray diffraction conditions, an diffraction intensity of less than 1 at a diffraction angle 2θ in the vicinity of 33° showing a $Fe_2O_3$ phase with respect to a peak diffraction intensity of 100 in a range of 2θ of 35° to 36° in the present of $MgFe_2O_4$, $Fe_3O_4$, and $Fe_2O_3$ phases.

On the other hand, at a heating temperature of more than 900° C., the heat-treated ceramic sinter has a risk of being deformed in surface and of not maintaining its dimensional precision which otherwise is required for magnetic memory devices.

As described above, the cleaning step for cleaning a ceramic sinter to wash out ground particles which has left on the surface after machining the sinter removes the particles on the surface, but cannot remove ground particles hidden inside opening pores or cracks in the surface. The heat treatment step according to the invention precipitate aggregates of a conductive component contained in the ceramic on the surface of the sinter so that the aggregates can bury the cracks under the surface and dissolve the particles hidden in the pores, resulting in absence of particles in the surface.

After the heat treatment, the ceramic sinter may be again cleaned with the above mentioned means such as water cleaning with surfactant, ozone or ultraviolet cleaning and ultrasonic cleaning, and rinsed with deionized water.

Example 1

In order to produce spacers for magnetic memory devices, ceramic sinters were prepared including a sinter based on forsterite containing 35% by weight of iron oxide in terms of $Fe_2O_3$, another sinter of steatite containing 43% by weight of iron oxide in terms of $Fe_2O_3$, and further another sinter of alumina containing 20% by weight of tin in terms of $SnO_2$, all of which were ground into a ring having an inner diameter of 25 mm, an outer diameter of 30 mm and a thickness of 3.0 mm with a roundness of 3.0 μm or lower and polished on both the surfaces to form contacting surfaces which are to be in contact to magnetic memory substrates so as to have a surface roughness of 0.1 μm in arithmetic mean roughness Ra and a flatness of 0.2 to 0.4 μm.

The ceramic rings were subjected to ultrasonic cleaning and thereafter to heat treatment, which were provided for tests as will be described below. The heat treatment was carried out at various temperature levels. For comparison, also, the ceramic rings which have been ultrasonically cleaned as described above but not heat treated were prepared.

The rings of this example and comparison were observed by scanning electron microscope to determine whether particles were left in pores of the surfaces and whether aggregates on the surface present were present for each ring.

Electron microscopic photographs were taken of samples using Rigaku TAS-200 type scanning electron microscope in conditions of an acceleration voltage of 15 to 30 kV, with a tilt angle of zero degree and with a secondary electron detector.

Other testes were conducted to inspect deformation of ceramic sinters during heat treatment. When flatness and roundness of the heat treated specimens were within, respectively, 0.1 μm and 5.0 μm larger than those before the treatment of the corresponding specimens, the specimens were considered to be sound sinters with substantially no change in dimensional preciseness in heat treating, while the others that were changed during heat treatment were estimated to be rejects, which was impossible to be used.

Each of the heat-treated sinters was immersed in water of 200 milliliters for a give period of time while undergoing ultrasonic vibration, and thereafter, the cleaning water is measured by a CLS-700 type particle counter made in PMS Co. to count the number of particles (over 2.0 μm in size) dispersed in a unit volume of the water, which were represented by ratios as compared with particle number data for non-heat-treated comparative examples which had measured, in the same manner, prior to the heat treatment after the cleaning step.

Table 1 shows the test results for forsterite based ceramic sinters. Table 2 and 3 show the test results for sinters based on, respectively, steatite and alumina. In those tables, Tg shows glass transition temperature, and ST shows softening temperature of each base sinter without containing a conductive component.

TABLE 1

| | heat treat temp. (° C.) | aggregates | particles in pore | ratio of particle number (%) | deformation |
|---|---|---|---|---|---|
| 1 | Tg − 600 | No | Many | 100 | No |
| 2 | Tg − 500 | Iron oxide | a few | 80 | No |
| 3 | Tg − 400 | Iron oxide | No | 80 | No |
| 4 | Tg − 200 | Iron oxide | No | 30 | No |
| 5 | Tg | Iron oxide | No | 10 | No |
| 6 | ST | Iron oxide | No | 7 | No |
| 7 | ST + 200 | Iron oxide | No | 5 | No |
| 8 | ST + 400 | Iron oxide | No | 4 | no |
| 9 | ST + 600 | Iron oxide | No | 3 | No |
| 10 | St + 700 | Iron oxide | No | 3 | much | sinter: forsterite -iron oxide
Tg: glass transition temperature: 689° C. for forsterite,
ST: softening temperature: 702° C. for forsterite.

TABLE 2

| | heat treat temp. (° C.) | aggregates | particles in pores | ratio of particle number (%) | deformation |
|---|---|---|---|---|---|
| 1 | Tg − 600 | No | Many | 100 | No |
| 2 | Tg − 500 | Iron oxide | a few | 80 | No |
| 3 | Tg − 400 | Iron oxide | No | 60 | No |
| 4 | Tg − 200 | Iron oxide | No | 30 | No |
| 5 | Tg | Iron oxide | No | 10 | No |
| 6 | ST | Iron oxide | No | 7 | No |
| 7 | ST + 200 | Iron oxide | No | 5 | No |
| 8 | ST + 400 | Iron oxide | No | 4 | no |
| 9 | ST + 600 | Iron oxide | No | 3 | No |
| 10 | St + 700 | Iron oxide | No | 3 | much | sinter: steatite -iron oxide
Tg: glass transition temperature: 677° C. for steatite
ST: softening temperature: 706° C. for steatite.

TABLE 3

| | heat treat temp. (° C.) | aggregates | particles in pores | ratio of particle number (%) | deformation |
|---|---|---|---|---|---|
| 1 | Tg − 600 | No | Many | 100 | No |
| 2 | Tg − 500 | Tin oxide | a few | 90 | No |
| 3 | Tg − 400 | Tin oxide | a few | 75 | No |
| 4 | Tg − 200 | Tin oxide | No | 60 | No |
| 5 | Tg | Tin oxide | No | 50 | No |
| 6 | ST | Tin oxide | No | 35 | No |
| 7 | ST + 200 | Tin oxide | No | 20 | No |
| 6 | ST + 400 | Tin oxide | No | 10 | no |
| 9 | ST + 600 | Tin oxide | No | 10 | No |
| 10 | St + 700 | Tin oxide | No | 7 | No | sinter: alumina- tin oxide
Tg: glass transition temperature: 779° C. for alumina,
ST: softening temperature: 796° C. for alumina.

It is found from those Tables that the heat treatment of this example performed in a proper temperature range may reduce the particle number separated from the sinters over 30% as compared with those of the comparative samples having not heat treated. The heat treatment allows particles or other impurities which are produced in surface grinding and attached on, or hidden in the pores of, the surface of a sinter to be cover or dissolve with precipitated aggregates having low temperature melting on the surface during high temperature heating.

However, heat treatment at a temperature over 600° C. plus the softening temperature of a ceramic sinter is difficult to maintain the dimension preciseness which has secured at the time of surface grinding, which increases the surface flatness after the heat treatment more than 0.1 µm with respect to that in the grinding step and the roundness of a ring or disc member of the ceramic sinter after the heat treatment more than 5 µm with respect to that in the grinding step.

Therefore, it is seen that the heat temperature of the heat treatment is suitable to be in a rang of temperature between a softening temperature plus 600° C. and a glass transition temperature minus 500° C., this temperature range achieving effective removal of particles from opening pores in the surface of the sinter due to aggregation of a conductive component on the surface without any deterioration in dimensional preciseness of the surface.

Figure 5:
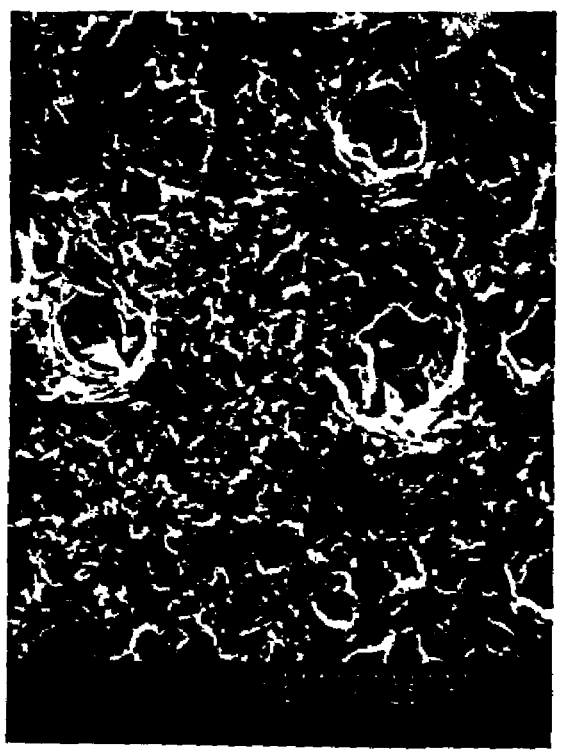
FIGS. 5A and 5B show scanning electron microscopic photographs showing a surface of a forsterite sinter after cleaning the surface but having heat treated at low temperature sufficiently, FIG. 5B having a greater magnitude than FIG. 5A.
Figure 5:

FIGS. 5A and 5B show scanning electron micrographs of a surface of the forsterite ceramic sinter, Sample No. 1 in Table 1, containing 35% of iron oxide in terms of $Fe_2O_3$ which sinter has been ultrasonically cleaned after grinding its surfaces and heat treated at a low temperature of 89° C. (=Tg−600° C.). The micrographs illustrate some pores opening in the surface having a number of particulate residues of 1 to 5 µm in size left in the pores even after cleaning.

Figure 4:
FIGS. 4A and 4B are scanning electron microscopic photographs showing a surface of a forsterite sinter after annealing in accordance with an embodiment of the present invention, FIG. 4B having a greater magnitude than FIG. 4A.
Figure 4:

FIGS. 4A and 4B show scanning electron micrographs of a surface of the forsterite ceramic sinter, Sample No. 6 in table 1, which, after cleaned as shown above, has been heat treated at 702° C. (=softening temperature St), but at a temperature somewhat lower than one at which to deteriorate the surface preciseness. It is found from the photographs of FIGS. 4A and 4B that the heat-treated surface has no particle left in pores at the surface so that the heat treatment after grinding surfaces are effective to remove ground particles perfectly from the surfaces. The surfaces from which particles are removed in this heat treatment step can be observed to have a great number of aggregates distributed thereon. It is determined from mapping chemical components on the surface using EDS analysis that the aggregates contain a conductive component of $Fe_2O_3$ which has added in the ceramic body, which is assumed to result from precipitation, to a ceramic surface, of condensed $Fe_2O_3$ particles in an island configuration from the ceramic body during heating.

Figure 6:
FIGS. 6A and 6B are scanning electron micrographs of surfaces of a forsterite sinter, FIG. 6A showing the heat treated sinter according to the present invention and FIG. 6B showing a cleaned sinter after grinding.
Figure 6:

FIG. 6A shows a scanning electron micrographs showing a surface of a heat treated sinter of Sample No. 4 in Table 1, before which the sample was ground and cleaned as shown in a scanning electron micrograph of FIG. 6B. Particulate aggregates arrayed on the surface of some crystal grains are illustrated in the heat treated sample, as compared with the sample having not yet heated.

Magnetic memory devices were fabricated with spacers made of Sample No. 6 in Table 1, Sample No. 6 in Table 2 and Sample No. 6 in Table 3 which were used for supporting magnetic memory substrates made of glass. The magnetic memory devices were operated with the magnetic memory substrates rotated at a high rotation speed of 10,000 rpm for 1,000 hours, and thereafter the substrates were observed in microscopy, but no particle having a size over 2.0 µm were found on any substrates. This means that the heat treatment can provide high reliable spacers.

Also, other ceramic materials, such as, for example, mullite, zirconia, silicon carbide and silicon nitride than forsterite, alumina and steatite shown in this example exhibits good performances for spacers.

Example 2

Forsterite based ceramic sinters added with 35% by weight of $Fe_2O_3$ based on the total weight of each sinter were heat treated under the same heating conditions as Example 1 and the heat treated samples were supplied for testing as follows.

The samples were subjected to X-ray diffraction analysis to determine diffraction intensities of a $Fe_2O_3$ phase for a surface layer and a core of each sinter sample, and to surface resistance measurement to determine a specific resistance on the surface. Further, particle number measurement was conducted in the same manner as Example 1. These testing results are shown in Table 4.

TABLE 4

| No. | heat temp. | peak ratio | spec. resist ×10⁴ Ωcm | particle number (-/ml) >0.5 μm | >2.0 μm | deformation | conclusion |
|---|---|---|---|---|---|---|---|
| 1 | — | 0 | 3 | 3000 | 100 | No | Bad |
| 2 | 200 | 0 | 3 | 3000 | 100 | No | Bad |
| 3 | 300 | 0 | 3 | 2500 | 90 | No | Bad |
| 4 | 400 | 0 | 7 | 1000 | 50 | No | Good |
| 5 | 500 | 1 | 9 | 500 | 20 | No | Good |
| 6 | 600 | 1 | 20 | 400 | 15 | No | Good |
| 7 | 700 | 10 | 50 | 300 | 10 | No | Good |
| 8 | 800 | 20 | 70 | 300 | 10 | No | Good |
| 9 | 900 | 30 | 90 | 250 | 5 | No | Good |
| 10 | 1000 | 40 | 200 | 200 | 5 | Much | Bad |

It is found from Table 4 that Samples No. 4 to 9 exhibit an peak diffraction intensity in a range of 1 to 30 at a diffraction angle 2θ in the vicinity of 33° showing a $Fe_2O_3$ phase with respect to a peak diffraction intensity of 100 in a range of 2θ of 35° to 36° in the present of $MgFe_2O_4$, $Fe_3O_4$, and $Fe_2O_3$ phases under the above noted X-ray diffraction conditions, and that in those Sample Nos. 4 to 9, by this heat treatment, the particle numbers were reduced by 30% or more as compared with non-heat-treated inters. Thus, the heat treating step of the present invention is found to have a significant effect on removal of the residual ground particles in the surface which have included in pores in the surface of the sinter.

On the contrary, Sample Nos. 1 to 3 are zero in peak intensity of $Fe_2O_3$ in the surface layer, which means that $Fe_2O_3$ aggregates were not substantially produced, and those samples did not decrease in particle number over 30% compared to non-heat-treated sinters.

Further, Sample No. 10, which had been heat treated at 1000° C., had a surface deformed into a surface flatness of 0.2 μm, over its limit of 0.1 μm, and to a roundness of 0.4 μm over its limit of 5 μm, which could not maintain the surface dimension preciseness secured by previous grinding.

These results can conclude that the temperature range in heat treating may be preferable to be 400 to 900° C., in which range the heat treatment does not deteriorate a dimension preciseness given in the grinding step, and can generate many $Fe_2O_3$ aggregates enough on the surface of the sinter to remove residual ground particles and to prevent particles from separating from pores and cracks on the surface.

Next, magnetic memory devices were fabricated using spacers of Sample No. 6 for spacing magnetic memory substrates, and tested by rotating at a rotation speed of 10,000 rpm for 1,000 hours and thereafter by microscopically observing particles over 2.0 μm in size which could be attached on the substrates; however, no particle was not able to be recognized on any surface for the magnetic memory substrate.

Further, the resistance test sowed that the bulk specific resistance on surfaces of the sinters was made sufficiently low, in a range of $10^4$ to $10^7$ Ωcm.

Thus, the process of the invention including a heat treatment step is found to provide high reliability performances for spacers.

What is claimed is:

1. A process of producing a member for supporting a magnetic disc substrate, comprising:
    providing a ceramic sinter comprising ceramic grains and conductive grains comprising at least one conductive component selected from the group consisting of iron, niobium, tin zinc, copper, nickel, cobalt and chromium;
    machining the sinter into a desired shape, and
    forming aggregates of the conductive grains at the surface of the ceramic sinter by annealing.

2. The process according to claim 1, wherein forming aggregates comprises heating the member at a temperature between a glass transition temperature of the sinter minus 500° C. and a softening temperature of the sinter plus 600° C.

3. The process according to claim 1, wherein the ceramic grains comprise forsterite and the conductive grains comprise at least one compound selected from the group consisting of $MgFe_2O_4$, $Fe_3O_4$, and $Fe_2O_3$, and forming aggregates comprises heating the member at a temperature between 400 and 900° C. in air atmosphere.

4. The process according to claim 3, wherein in X-ray diffraction analysis using Cu Kα monochromatic rays, a peak intensity of $Fe_2O_3$ phase at a diffraction angle 2θ of 33°, contained inside the sinter is 1 or less with respect to a peak diffraction intensity of 100 in a range of 2θ of 35° to 36° in the presence of $MgFe_2O_4$, $Fe_3O_4$, and $Fe_2O_3$ phases, while a peak diffraction intensity of $Fe_2O_3$ phase at the diffraction angle 2θ of 33° in X-ray diffraction analysis which is contained in a peripheral surface layer of the sinter is in a range of 1 to 30 less with respect to a peak diffraction intensity of 100 in a range of 2θ of 35° to 36° in the presence of $MgFe_2O_4$, $Fe_3O_4$, and $Fe_2O_3$ phases.

5. The process according to claim 1, wherein the member is a ring-shaped spacer interposed between two magnetic disc substrates for a magnetic disc memory device.

* * * * *